United States Patent
Brardjanian et al.

(10) Patent No.: US 6,590,945 B1
(45) Date of Patent: Jul. 8, 2003

(54) METHOD AND APPARATUS FOR FREQUENCY OFFSET COMPENSATION

(75) Inventors: Nima Brardjanian, Eatontown, NJ (US); Yong J. Lee, Holmdel, NJ (US); Walid E. Nabhane, Eatontown, NJ (US); Mohsen Sarraf, Rumson, NJ (US); Sheng-Jen Tsai, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/353,009

(22) Filed: Jul. 13, 1999

(51) Int. Cl.$^7$ ................................................ H03D 3/02
(52) U.S. Cl. .................. 375/340; 375/243; 375/244; 375/226; 375/281; 375/283; 375/285; 375/304; 375/325; 375/331; 375/332; 375/362; 329/304
(58) Field of Search .................... 329/304; 375/244, 375/279, 280, 281, 283, 304, 322, 325, 329, 330, 331, 332, 340, 362, 226, 243, 285

(56) References Cited

U.S. PATENT DOCUMENTS

| | | | |
|---|---|---|---|
| 4,293,818 A | * 10/1981 | Jarger | .......................... 329/50 |
| 4,491,155 A | 1/1985 | Meyer et al. | |
| 5,283,815 A | * 2/1994 | Chennakeshu et al. | ........ 375/84 |
| 5,465,271 A | * 11/1995 | Hladik et al. | ................ 375/267 |
| 5,499,273 A | 3/1996 | Kull et al. | |
| 5,504,784 A | * 4/1996 | Niyogi et al. | ................ 375/341 |
| 5,588,026 A | 12/1996 | Ishikawa et al. | |
| 6,028,894 A | * 2/2000 | Oishi et al. | .................. 375/227 |

* cited by examiner

*Primary Examiner*—Chi Pham
*Assistant Examiner*—Pankaj Kumar

(57) ABSTRACT

A simplified method for frequency offset estimation in a TDMA cellular PCS environment using π/4-shifted DQPSK comprises the steps of multiplying a complex conjugate of a received complex-valued symbol and a succeeding symbol to produce a comparison vector having an angle equal to the phase angle between the received complex-valued symbol and the succeeding symbol, rotating the comparison vector so that the angle thereof is between 0° and 90°, and estimating the frequency offset by determining a constant deviation of the phase angle from an ideal phase angle value of 45° by calculating an average phase angle for a plurality of successive comparison vectors or correlating the rotated comparision vector against a bank of unit vectors to determine a maximum correlation.

26 Claims, 3 Drawing Sheets

METHOD AND APPARATUS FOR FREQUENCY OFFSET COMPENSATION

BACKGROUND OF THE INVENTION

1. Field of the Invention

The present invention relates generally to a method and apparatus for communication, and more particularly, to a method for the estimation and correction of frequency offset between the local oscillator of a receiver and the carrier frequency of a received signal, and to a radio system having means for frequency offset estimation and correction.

2. Description of the Related Art

A conventional wireless radio system used for telephony ("cellular system") consists of three basic elements—namely, mobile units, cell sites, and a Mobile Switching Center ("MSC") In a basic cellular system, a geographic service area, such as a city, is subdivided into a plurality of smaller radio coverage areas, or "cells". A mobile unit communicates by RF signals to the cell site within its radio coverage area. The cell site's base station converts these radio signals for transfer to the MSC via wire (land line) or wireless (microwave) communication links. The MSC routes the call to another mobile unit in the system or the appropriate landline facility. These three elements are integrated to form a ubiquitous coverage radio system that can connect to the public switched telephone network (PSTN).

A mobile unit contains a radio transceiver, a user interface portion, and an antenna assembly, in one physical package. The radio transceiver converts audio to a radio (RF) signal and converts received RF signals into audio. The user interface portion includes the display and keypad which allow the subscriber to communicate commands to the transceiver. The antenna assembly couples RF energy between the electronics within the mobile unit and the "channel", which is the outside air, for transmission and reception. Each mobile unit has a Mobile Identification Number (MIN) stored in an internal memory referred to as a Number Assignment Module (NAM).

A cell site links the mobile unit and the cellular system switching center, and contains a base station, transmission tower, and antenna assembly. The base station converts the radio signals to electrical signals for transfer to and from a switching center.

Digital cellular systems and systems combining analog and digital communication techniques are currently more popular than purely analog systems. Presently, there are three basic types of digital cellular technology: Frequency Division Multiple Access (FDMA), Time Division Multiple Access (TDMA) and Code Division Multiple Access (CDMA). Digital cellular systems currently fall within these three categories and many use a combination of these technologies along with analog techniques. There are also variations in the way radio technologies allow duplex operation, called Frequency Division Duplex (FDD) and Time Division Duplex (TDD).

In order to receive a transmitted digital signal, coherent or non-coherent detection is generally used to extract encoded voice or data contained in the transmitted signal. In a typical coherent detector, for example, the modulated waveform is fed to a mixer, wherein the modulated wave is mixed (i.e., multiplied) with a "local oscillator" signal having a frequency that is matched to the frequency of the modulated signal.

In time division multiplexed digital communication systems such as the North American TDMA cellular telephone system, information is transmitted as symbols encoded in the phase of the transmitted signal with respect to its carrier. Proper extraction of the symbols necessitates that the local oscillator frequency used to demodulate the received signal is identical to the carrier frequency of the received signal. As is well known in the art, a frequency difference between the carrier of a modulated signal and the local oscillator used to extract the modulated information causes the apparent phase relationship to "rotate" undesirably.

Certain transmission protocols have the tendency to reduce this effect. For instance, in differential quadrature phaseshift keying ("DQPSK"), the encoded information is contained not in the absolute phase of the modulated signal, but in the difference between the phase of a given symbol and the phase of the previous symbol. In an ideal channel, a frequency offset between the local oscillator of the receiver and the carrier frequency of the transmitted signal does not present a significant problem as long as the symbol frequency is much larger than the frequency offset.

The cellular channel is not ideal, however, and is subject to various types of distortion such as delay spread due to multipath fading, Doppler effect, and the like. A process such as adaptive equalization, which involves adaptive channel distortion characterization, is needed in order to extract symbols accurately from the time-varying channel. To estimate and compensate for channel-induced distortion, cellular systems typically utilize adaptive equalization techniques which predict the channel response based upon the transmission of known data (eg., a so-called pilot signal or training sequence). However, such processes are sensitive to significant uncorrected frequency offsets, which may cause the channel to vary beyond the rate at which the adaptive processes can adapt. Even for DQPSK systems, therefore, accurate frequency offset compensation is necessary.

A conventional approach to frequency tracking is by use of a phase-locked-loop ("PLL"). A PLL circuit is typically formed as a phase detector fed by input and feedback signals, a loop filter and a voltage controlled oscillator for producing a sine wave (i.e., the feedback signal). In a PLL, the phase of the received signal, or a frequency-translated version thereof (i.e., an intermediate frequency (IF) signal), is compared with the local phase reference (i.e., the local oscillator), and the average phase difference over time is used to adjust the frequency of the reference. A basic PLL is characterized by a pull-in range $B_p$. However, as $B_p$ increases, so does the variance of the phase error. AFC (Automatic Frequency Control) units, FLLs (Frequency Locked Loops) or PLL's with phase and frequency detectors are often used to track such signals. These circuits generally produce an estimate of the average input frequency only, and additionally require an elemental PLL if the phase is to be acquired. Unfortunately, phase-locked-loop systems tend to result in a cellular telephone system can be unacceptable. In addition, in cellular systems based on packetized data transfer, control data is often contained in a single packet, which may be lost before phaselock is achieved. An objectionable amount of dead time may also be encountered during handoff from one cell to another. This is true both for conventional, analog phase-locked-loop systems and for digital equivalents. Moreover, in wireless communications AFC design has been constrained by circuit complexity, and system designs have typically made frequency accuracy constraints somewhat loose to avoid prohibitive costs in complexity or processing requirements.

In addition, with the introduction of more optimal modulation schemes such as QPSK, relatively precise frequency estimates are often needed. Frequency errors may arise, for example, from the transmitter/receiver clock not being perfectly locked due to inaccuracies or drift in the crystal oscillator, as well as from large frequency shifts due to the Doppler effect, such as those occurring from vehicles moving at high speeds in open spaces. Many cellular systems allow only a small amount of time for achieving initial signal acquisition and require a minimum tracking error after initial acquisition. However, typical AFC or PLL circuits are not generally able to lock on or track a received signal with wide frequency shifts over a short period of time with a reasonable degree of accuracy.

The widespread demand for increased functionality and capacity in mobile duplex communications equipment has resulted in a rapid advancement in wireless technology. Over the past ten years, for instance, wireless telephony end-user equipment size, weight, and cost have dropped over 20% per year while advanced techniques in efficient bandwidth utilization have led to a tenfold increase in system capacity. To satisfy the increased demand in system capacity over conventional analog cellular systems, the Telephone Industry Association (TIA) promulgated in the late 1980's an Interim Standard for time division multiplexed wireless digital telephony, known as IS-54. As is well known in the art, IS-54 (revs. A and B), and the more current Interim Standard for time division multiplexed wireless telephony, IS-136, use Time Division Multiple Access (TDMA) digital technology, which is well known in the art. The reduced size, weight and cost of such consumer-based equipment is largely the result of increased integration density of mobile unit circuitry coupled with the development of low power, low range digital mobile units operating in a multiplexed environment and stationary equipment capable of handling the increased capacity.

Efforts to reduce the cost of cellular equipment have also led to the to the use of software executed by a Digital Signal Processor ("DSP") or other microprocessor installed in cellular end-user equipment to perform signal processing techniques conventionally performed solely by circuitry. For instance, frequency offset estimation and correction are often accomplished in software by an algorithm which determines frequency offset based upon the use of a known data such as a pilot sequence. In some applications, software is used to supplement a conventional PLL circuit to compensate for frequency offsets left uncorrected by the PLL. In other applications, software correction for frequency offset is performed to compensate for drift in a quartz crystal oscillator used in a mobile unit. Such techniques permit the use of lower precision circuit components than otherwise possible and facilitate a reduction in the the cost and size of mobile equipment. Certain digital techniques perform the local-reference adjustment relying solely on data extracted from the carrier in order to estimate the offset. Such techniques are not sufficient in a time-dispersive channel environment, however, because the process for extracting the data depends on adaptive processes, which are themselves relatively intolerant to significant frequency offsets. Such techniques for adjusting the local reference frequency can generally function only after the local oscillator frequency has already been adjusted.

Many conventional frequency offset correction techniques rely upon the premise that frequency offset can be estimated by monitoring the phase difference between successive symbol samples in a received waveform. Since frequency mismatch essentially results in a fairly constant phase offset in a received waveform over an entire burst of symbols, detection of this phase offset would provide a sufficiently accurate estimate of the frequency offset. One digital approach, described in U.S. Pat. No. 4,491,155, performs coherent demodulation of a received TDMA signal by producing a vector sum of reconstructed in-phase and quadrature phase signals. The phases of the incoming signal add constructively only at the optimal sample, and destructively in all other cases. Thus, the reconstruction signal having the greatest magnitude is used determining the phase shift due to frequency offset.

Another digital method, disclosed in U.S. Pat. No. 5,499,273, performs a successive accumulation over substantially an entire burst of sampled in-phase and quadrature phase (I and Q) components of a received signal to determine not only the frequency offset but also the sampling phase error. Magnitudes of received in-phase and quadrature phase sampled signals are determined, summed and distributed to accumulator registers for accumulating sums of the first and second signals for each sample time and substantially over a length of an expected burst. A maximum-minimum determination circuit chooses the sample time having the largest or smallest sum to provide a recovered clock signal. The carrier is recovered, and a downsampler downsamples the received in-phase and quadrature phase signals based on the recovered clock signal. In order to attenuate data-dependent effects sufficiently so that the frequency and phase-dependent effects dominate, however, it is necessary to average the phase relationships over a large number of symbols, which, in most cases, is an entire burst. This can result in a significant delay in achieving a sufficiently accurate frequency offset estimate.

In another approach, described in U.S. Pat. No. 5,588,026; the detected signal is raised to the M-th power to remove a modulation factor from the received signal. The M-th power signals for N symbols are accumulated to derive a phase component of the M-th power signals. The derived phase component is then divided into M to obtain an estimate of the phase shift due to frequency offset which represents a deviation from a true carrier frequency contained in the received signal. The received signal is then multiplied by the obtained estimation value in a form of a complex conjugate to remove the phase shift due to the frequency offset from the received signal. While this method provides for offset correction by use of a simplified software routine, it is effective only when the phase shift due to frequency offset is within a range df $-\pi/M$ to $\pi/M$ and is thus subject to uncertainty if the phase shift exceeds this range. In other words, since the estimation value of the phase shift is calculated as a value between $-\pi$ and $\pi$, a phase shift larger than $\pi/M$ contained in the received signal prior to the M-th power operation cannot be detected by the M-th power operation. To avoid this phase ambiguity, the method requires that the transmitted signal is differentially encoded twice, which requires additional processing and specially designed transmitting equipment which is generally incompatible with industry standards.

Accordingly, there is a need for a sufficiently rapid and simplified method and apparatus for frequency offset estimation and compensation which minimizes processing time and optimally avoids the need for additional circuitry.

SUMMARY OF THE INVENTION

The time and processing requirements needed to achieve an accurate frequency offset estimate can be minimized, even in systems that are to be used in time-dispersive channels by effectively adjusting the frequency of a receiver local oscillator in accordance with a "phase rotation" observed in the relationship between a plurality of successively received symbols. The present invention is based upon the recognition that certain modulation techniques exhibit statistical characteristics which are detectable despite the presence of severe channel distortion.

In π/4-shifted DQPSK, for example, the potential differential phase angles between two successively received symbols over an ideal channel will be ±45° or ±135°. While channel effects produce results which deviate from ideal conditions, even in the presence of severe channel distortion due, for example, to multipath effects and Doppler effect, there is a statistical concentration of differential phase angle values in the vicinity of +45° or ±135°.

In order to correct for frequency offset according to the present invention, therefore, selected pairs of successively received symbols in a communication system are multiplied to produce a set of vectors each having a phase angle representing the differential phase angle between the successive symbols. The resultant vectors are rotated so that the in-phase and quadrature phase components are positive. In π/4-shifted DQPSK, the angle of the rotated values, in an ideal channel, should be 45°. A deviation from 45° is observed, which is indicative of "phase rotation" due to frequency offset between the local reference and the carrier. This phase rotation can then be used to adjust the local reference frequency. Since this approach eliminates the need to average over long periods, the need for filtering out of data-dependent effects, and the use of known data sequences, the time required to achieve adequate frequency-offset compensation is shorter in many important environments than it is for conventional systems.

BRIEF DESCRIPTION OF THE DRAWINGS

The above-noted and additional features and advantages of the present invention are described below in connection with the accompanying drawings, in which.

DETAILED DESCRIPTION OF THE PREFERRED EMBODIMENTS

Figure 1:
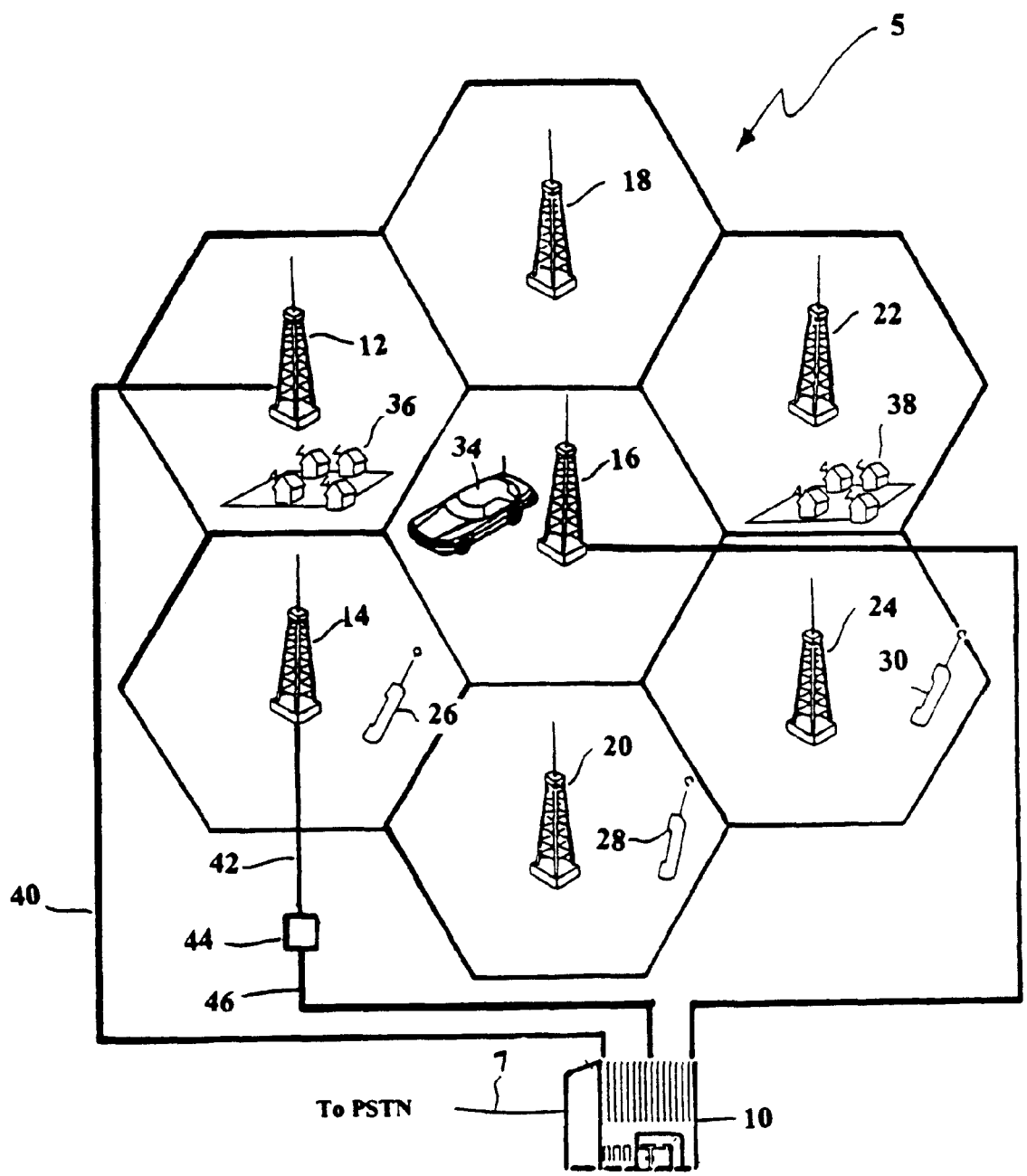
FIG. 1 is a diagram of a cellular communication system in which the present invention may be implemented.

One of the different approaches taken to effectively extend the limited radio frequency (RF) spectrum allocated to cellular systems has been through the use of time division multiplexed digital communications. In wireless communication systems employing the multiplexing of voice and data, bandwidth-efficient. modulation techniques are used to maximize the amount of information transmitted in the form of digital voice and data channels. One digital cellular system is based upon time division multiple access (TDMA) techniques and was first defined in TIA Interim Standard IS-54 (revs. A and B) and, more recently, in IS-136. In the North American TDMA system, which is currently the IS-136 system that accommodates TDMA digital and analog communications, typically 3 to 6 users (data channels) share a common 30 kHz channel in TDMA operation. Each user transmits data in an assigned time slot that is part of a larger frame. The gross bit rate of the data to be transmitted over the mobile channel is 48.6 kilobits per second (kbps). The modulation. method employed is π/4-shifted, differentially encoded, quadrature phase shift keying (π/4-shifted DQPSK).

The following detailed description of the present invention is directed primarily to improvements in cellular communications and, most notably, TDMA cellular communication systems. However, it will be appreciated by those in the art that the improvements in frequency offset estimation and correction for optimal signal detection disclosed herein are applicable to most types of communication systems and are not limited to TDMA communications or to cellular systems. While the preferred embodiments are described as being implemented in a PCS system, and, therefore, the North American TDMA system using π/4-shifted DQPSK modulation, it will be readily appreciated by those skilled in the art that other types of communication systems (e.g., analog, CDMA, FDMA, GSM, trunked or other landline systems, satellite communication systems, data networks, and the like) and other types of modulation techniques may also be adapted and/or designed to use the principles described herein, and the description of the present invention as an improvement for TDMA cellular communication is not intended to impart any limitations on the application of the principles described herein to any particular type of communication scheme.

To fully appreciate the manner in which the present invention estimates and compensates for frequency offset between a transmitted signal and the phase reference of a receiver, the manner in which frequency offset affects signal reception in the context of π/4-shifted DQPSK, as used in North American TDMA, will be described briefly below.

In π/4-shifted DQPSK, a series of bits of digitally encoded voice data is divided into successive pairs of bits, and the phase angle $\Theta_k$ of successive symbol periods of a high-frequency sinusoidal wave used as a carrier are determined depending on the 2-bit combinations 00, 01, 10, 11 (a 2-bit combination $\{X_k, Y_k\}$ is referred to as a "symbol"). A sinusoidal wave S(t) having a phase angle $\Theta_k$ corresponding to the kth symbol is expressed by:

$$S(t)=\cos(\omega_c t+\Theta_k) k=1,2,3,4 (-T/2 \leq t \leq T/2) \quad (1)$$

where $\Theta_k$=+45°, ±135°, $\omega_c$ is the angular frequency of a carrier sine wave (if a carrier frequency is $f_c$, then $\omega_c=2\pi f_c$) and T is the duration of one symbol.

The sinusoidal wave S(t) may also be expressed as follows:

$$S(t)=a_k \cos(\omega_c t)+b_k \sin(\omega_c t) \quad (2)$$

where $(a_k, b_k)=(1/\sqrt{2},1/\sqrt{2}), (-1/\sqrt{2},1/\sqrt{2}), (1/\sqrt{2},-1/\sqrt{2})$, and $a^2+b^2=1$.

The values of $(a_k, b_k)$ represent the in-phase (I) and quadrature phase, (Q) components of a symbol on an I-Q rectangular Cartesian coordinate plane composed of an in-phase axis (I axis) and a quadrature axis (Q axis).

In a conventional digital cellular receiver for receiving QPSK modulated waves, a received signal R(t) may be expressed by:

$$R(t)=a' \cos(\omega_c t)+b' \sin(\omega_c t) \quad (3)$$

where (a',b') are $(a_k, b_k)$ as received.

In a conventional digital cellular receiver, the received signal R(t) expressed by the foregoing equation is subjected to quadrature detection to reproduce the combinations $(a_k, b_k)$ and to determine phase differences between succeeding combinations $(a_k, b_k)$ in differential decoding to thereby reproduce the symbols as a series of bits 0 and 1 identical to the original serial digitized voice signal.

The typical quadrature detector divides the received signal R(t) into two identical signals, multiplies one of the signals by a sinusoidal wave $\cos(\omega_c t)$ which is of the same frequency and phase as the transmitted carrier, and multiplies the other signal by the same sinusoidal wave shifted by 90° (i.e., $\sin(\omega_c t)$). This quadrature detection process is called a coherent or synchronous detection process. The results of the process are expressed as follows:

$$R(t)\cos(\omega_c t) = (\tfrac{1}{2})(a' + a' \cos 2\omega_c t + b' \sin 2\omega_c t) \quad (4)$$

and $$R(t)\sin(\omega_c t)' = (\tfrac{1}{2})(b' - b' \cos 2\omega_c t + a' \sin 2\omega_c t) \quad (5)$$

The signals expressed by equations (4) and (5) are passed through a low-pass filter to remove multiple frequency components therefrom, thus obtaining $(\tfrac{1}{2})a'$, $(\tfrac{1}{2})b'$.

In coherent detection, the results expressed by equations (4) and (5), and the success of the subsequent low pass filtering, necessitate the generation of a carrier having a frequency and phase which are equal to those of the transmitted carrier. In conventional communication systems, methods of extracting and reproducing such a carrier in a received signal generally include inverse modulation, multiplication, PLLs, and Costas receivers to reproduce a carrier based on waveform information contained in the received signal.

However, if the received signal has a distorted waveform due, for example, to time-dispersive channel effects such as multipath fading or frequency and amplitude shifts due to the Doppler effect, a conventional demodulator will fail to extract and reproduce a carrier from the transmitted signal with sufficient accuracy. Under such conditions, a "phase rotation" will be contained in the demodulated signal and conventional coherent detection cannot be relied upon as a means for extracting transmitted information.

Stated otherwise, if a frequency offset exists between the local oscillator of the receiver and the carrier frequency of the received signal, the frequency offset will affect demodulation and the signals expressed by equations (4) and (5) above will be distorted by the frequency offset. Such distorted signals can be expressed as follows:

$$R(t)\cos(\omega' t + \Theta) = (\tfrac{1}{2})[(a' \cos(\Delta\omega t + \Theta) - b' \sin(\Delta\omega t + \Theta)] \quad (6)$$

and $$R(t)\sin(w' t + \Theta) = (\tfrac{1}{2})[(a' \sin(\Delta\omega t + \Theta) + b' \cos(\Delta\omega t + \Theta)] \quad (7)$$

where $\Delta\omega$ is the difference between the transmitted carrier $\omega_c$ and the detected carrier $\omega'$ and is the carrier offset.

As can be seen from equations (6) and (7), the signal (a',b') produced as a result of the coherent detection is expressed as a vector, on the I-Q plane, having an absolute value $(\tfrac{1}{2})(a'^2 + b'^2)^{1/2}$ and which rotates at anangular velocity of $\Delta\omega$. When the vector (a',b') is rotating, the normal decoding process may not yield sufficiently accurate results. Consequently, it is necessary to detect and compensate for frequency offset.

As noted above, digital mobile communication systems are highly susceptible to time-dispersive channel effects such as multipath fading and the Doppler effect because they are often required to communicate in locations such as between, buildings or in moving vehicles. Therefore, the local reference for generating a detecting carrier signal, otherwise known as a phase reference or local oscillator, used to carry out detection in stationary and mobile receivers of digital mobile communication devices must be modified in some respects. Since the carrier frequency of the transmitted signal may differ from the frequency of the transmitter due to time-dispersive channel effects, generation of a carrier signal having the same frequency as the transmitter carrier may not result in the accurate reproduction of a transmitted series of symbols. Therefore, it is necessary to effect quadrature detection using a detecting carrier having a frequency and phase which are slightly different from the transmitted carrier. This is commonly referred to in the art as quasi-synchronous detection because the frequency of the detecting carrier signal does not match the frequency of the transmitter but instead matches the frequency of the carrier as modified by the channel.

A known method for facilitating coherent, quasi-synchronous detection of transmitted signals is through the use of a pilot signal. For example, in a cellular communication system the forward channel, or down-link (i.e., from base station to mobile unit) may be coherently detected if the base station transmits a pilot signal. Subsequently, all the mobile units use the pilot signal to estimate the channel phase and magnitude parameters. However, for the reverse channel, or up-link (i.e., from mobile unit to base station), using such a common pilot signal is not feasible.

A solution to the foregoing dilemma has been through the introduction of reference bits into the information data stream prior to transmission, and the subsequent extraction of these reference bits and their use in forming an estimate of the channel response. This estimated channel response is in turn used to coherently detect estimated data symbols. However, this method requires additional processing time and consumes additional power.

Since the transmission of a known pilot signal or reference bit sequence is subject to the same distortion as the message signal, these signals are subject to erroneous detection due to frequency offset. It would be advantageous to provide a blind frequency offset detection scheme in which a priori knowledge of a received information sequence is not necessary to compensate for offset. Such a method could also be used with a pilot signal or other known data, when available, to correct for frequency offset and can also be performed on a temporal basis on any data (such as actual message data) to maintain a desired bit error rate.

The present invention provides a frequency offset estimating scheme which is capable of detecting and correcting for severe time-dispersive channel distortion without the need for a known information sequence and without the need for PLL or AFC circuitry. The method and apparatus of the present invention provide a quicker and more simplified approach to signal recovery. The method of the present invention may also be used to supplement conventional means such as those using a pilot signal or PLL circuit to enhance the accuracy of such traditional frequency offset compensation techniques.

Referring to FIG. 1, a diagram of a conventional TDMA digital telephony system 5 in which the present invention may be practiced is shown. The system 5 includes a number of fixed base units 12, 14, 16, 18, 20, 22 and 24 and a number of mobile transceivers 26, 28, 30, 32, 34, as well as mobile units located in buildings 36 and 38. By use of time division multiple access, each mobile transceiver can access a fixed base unit through a separately assigned channel to carry duplex communication on a time division multiplexed (TDM) basis. In a conventional TDMA system such as that illustrated in FIG. 1, the average power utilized by the mobile transceivers is on the order of 5 to 10 milliwatts or less to provide a range of several hundred to a thousand feet between a base station and its mobile transceivers. To accommodate a relatively large service area, several base stations are used with individual calls being successively handed off from base station to base station as their corresponding callers carry their mobile units from the service area (i.e., cell) associated with one base station to that of an adjacent base station. An appropriate switch (not shown) which is located within a local central end office is suitably programmed to operate in a similar manner as does a mobile telephone switching office in order to controllably handoff calls from one base station to another as the callers transit corresponding local service areas associated therewith.

The base stations are connected to the switch located within the central office 10 to provide access to the public switched telephone network. This connection can typically occur in one of two ways; either through copper digital lines 40, 42 as in base stations 12 and 16, or via intermediary copper digital line 42 to remote electronics 44, as in the case of base station 14. The remote electronics 44 contain fixed distribution and concentration facilities for multiplexing traffic, in addition to that provided by the base station 14, onto fiber feeder 46 which, in turn, feeds central office 10. The switch located within the central office is connected, through a trunk 7, to the public switched telephone network.

In the TDMA system illustrated in FIG. 1, each base station transmits time division multiplexed bit streams on a predefined carrier frequency using $\pi/4$-shifted DQPSK modulation, with an inter-carrier spacing of 150–300 kHz and within a given operating frequency band.

Each base station continuously transmits on a time division basis and the mobile transceivers transmit in bursts to their associated base station. Two different carrier frequencies are used to carry communication between each base station and a mobile transceiver; one frequency f1 for base station 30, to carry communication from that base station to each of its mobile transceivers and another frequency f2 for base'station 30, to carry communication from each of the mobile transceivers to this base station. Although adjacent base stations use different pairs of frequencies, these carrier frequencies are also reused for base stations that are spaced sufficiently far apart from each other to conserve spectrum. The spacing is appropriately set to ensure that co-channel interference that might occur at any port will remain at an acceptably low level.

Figure 2:
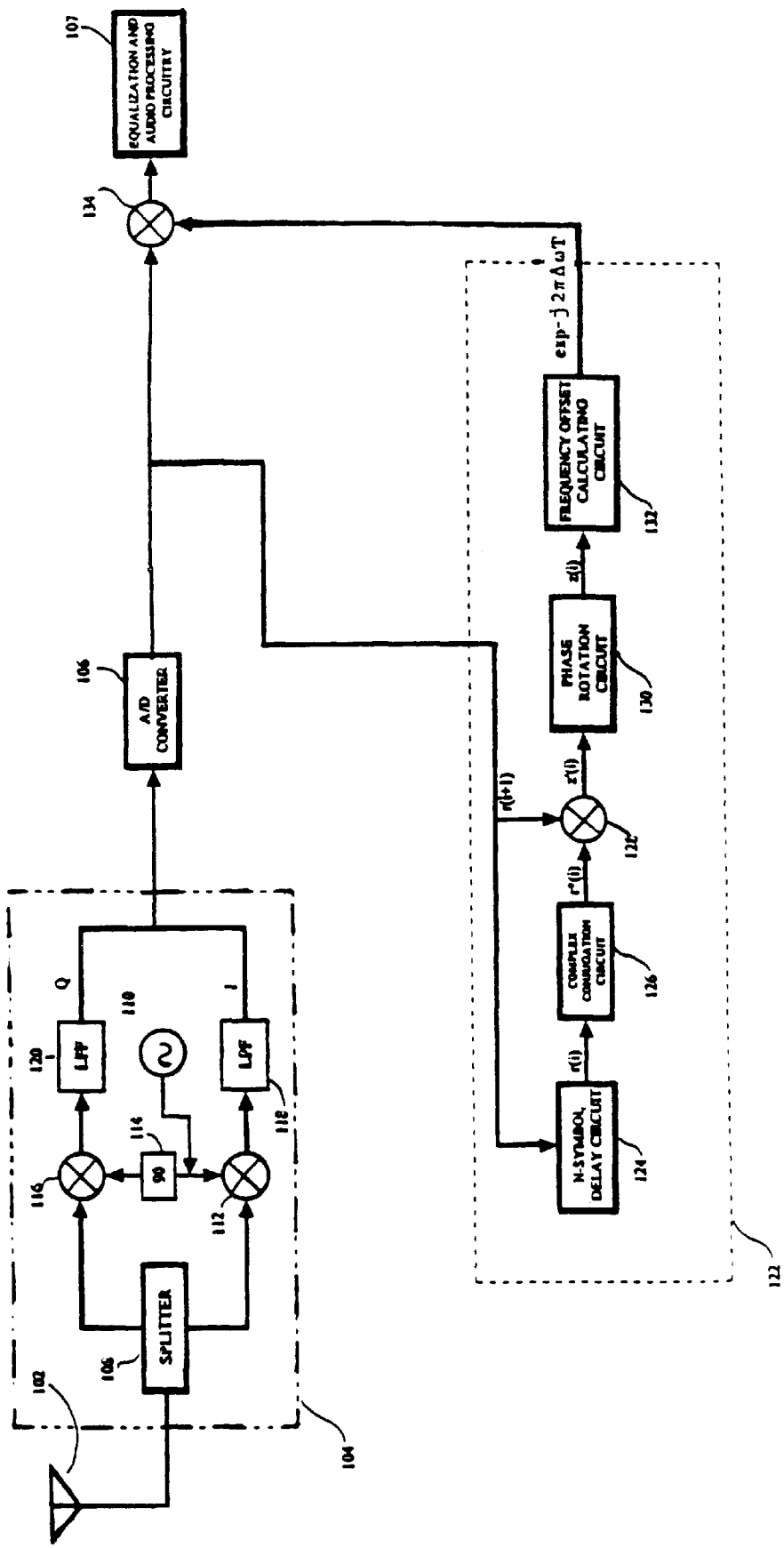
FIG. 2 is a block diagram of a receiver in accordance with a preferred embodiment of the present invention.

FIG. 2 is a block diagram of a digital demodulator 100 incorporating frequency offset estimation and compensation means according to the present invention. The demodulator 100 is incorporated in both the base stations and the mobile transceivers in a TDMA portable radio communications system. As noted above, both the base stations and the mobile units transmit symbol bursts, the base stations using TDM for transmission of symbol bursts to either three or six users. For purposes of discussion, it will be assumed that the demodulator 100 shown in FIG. 2 represents a demodulator in a mobile transceiver unit.

An antenna 102 receives each radio transmitted burst having a carrier frequency in the range of 0.5 to 5 GHz. An analog receiver 104 amplifies, filters and downconverts the RF signal to a baseband signal. An analog-to-digital converter 106 digitizes the IF signal by sampling at four times the symbol rate (or any other desired multiple thereof). The resultant output consists of in-phase (I) and quadrature phase (Q) signals. A ROM may be used in subsequent stages of the demodulator as a look-up table of arctangents to determine the phase of each sample from the I and Q signals. Subsequent circuitry, including equalization and audio processing circuitry 107, processes the signals to reproduce transmitted voice and information data.

In the presently described embodiment, the analog receiver 104 is a DQPSK receiver in which the input signal from an antenna 102 is applied to a power splitter 108 directly, as shown, or after translation to an intermediate frequency. A local oscillator 110 applies its output directly to a first mixer 112 and through a 90° phase shifter 114 to a second mixer 116. Low pass filters 118 and 120 pass only the difference frequencies in the resultant outputs of the mixers 112, 116 and thereby produce baseband signals representing the in-phase (I) and quadrature phase (Q) components, respectively, of the received signal.

The complex-valued output of the combination of the baseband I and Q components is applied to a complex value sampler which, in practice, is generally a pair of analog-to-digital converters which are symbolically illustrated in FIG. 2 as a single analog to digital converter 106. One output of the analog-to-digital converter 106 is supplied to a frequency offset estimation and correction circuit 122. In practice, this circuit is implemented in a digital signal processor (DSP) or microprocessor according to the principles described herein.

According to the present invention, successive symbols in the received burst are processed to determine the phase error due to frequency offset between the local oscillator 110 of the receiver 104 and the detected carrier of the received signal. As will be described in detail hereinafter, the frequency offset estimation and correction circuit 122 periodically processes a plurality of successively received symbols to estimate and compensate for a frequency offset due to local oscillator mismatch.

In accordance with the present invention, frequency offset compensation is accomplished by monitoring for and eliminating phase rotation observed in an incoming signal. As noted above, certain modulation schemes exhibit characteristics which are detectable even in the presence of severe channel-induced distortion. In $\pi/4$-shifted DQPSK, for example, the potential differential phase angles between two consecutive received symbols over an ideal channel will be $\pm 45°$ or $\pm 135°$. While channel-induced distortion results in received symbols which deviate from ideal conditions, even in the presence of severe channel distortion due, for example, to multipath effects and the Doppler effect, applicants have discovered that there is a statistical concentration of differential phase angle values in the vicinity of $\pm 45°$ or $\pm 135°$. While distortion of many types will cause results which deviate from this ideal, frequency offset may be considered to be constant for an appreciable period of time and will thus result in a relatively constant deviation from expected results. By measuring the deviation from this ideal result, therefore, various channel effects can be removed. One such effect is frequency offset due, for example, to multipath fading or frequency shift due to the Doppler effect. It will be understood by those of ordinary skill in the art that monitoring for variations in such a characteristic between successive symbols will permit detection of channel effects in many different types of modulation schemes.

In order to correct for frequency offset according to the present invention, therefore, selected pairs of successive symbols in a communication system are multiplied so that the resultant vector has a phase angle representing the differential phase shift between the successive symbols due to the $\pi/4$-shifted DQPSK (i.e., a $\pm 45°$ or $\pm 135°$ phase shift). The resultant values are rotated so that the in-phase (I) and quadrature phase (Q) components are positive and the angle of the vector is in the first quadrant. As a result of rotation, the phase angle of the normalized values, in an ideal channel, should be 45°. A constant deviation from 45° is indicative of "phase rotation" due to frequency offset between the local reference and the carrier. This phase rotation can then be used to adjust the local reference or the symbol sequence and thereby eliminate the frequency offset.

The calculations performed by the frequency offset estimation and correction circuit 122 will now be described.

In the presently described embodiment, the frequency offset estimation and correction circuit 122 performs frequency offset estimation without the use of known data such as a pilot signal, training sequence or sync word. In alternate embodiments, the present invention may also be practiced using such known data. In the preferred embodiment, frequency offset is estimated without the need for a priori knowledge of a symbol sequence, so that frequency offset occurring during transmission of message data may be eliminated. Thus, in accordance with the present invention frequency offset is estimated and eliminated based on the analysis of successive symbols in a received signal, whether or not such symbols represent known data, to provide continuous correction for frequency offsets occurring during any desired continuous period of communication between a transmitter and receiver.

The frequency offset estimation and correction circuit 122 includes an N-symbol delay circuit 124 which receives the output symbols from the analog-to-digital converter 106 and outputs a symbol delayed by N symbol periods, wherein N is an integer representing a respective received symbol. In the presently described embodiment, N is equal to 1. Accordingly, in the preferred embodiment, the N-symbol delay circuit 124 outputs a symbol delayed by one symbol period. Assuming that a current symbol is represented by $r(i+1)$, wherein i is an integer representing a symbol period, the output of the N-symbol delay circuit 124 in the preferred embodiment is $r(i)$.

The output of the N-symbol delay circuit 124 is supplied to a complex conjugation circuit 126, which outputs the complex conjugate of $r(i)$ (i.e. $r^*(i)$).

A complex multiplier 128 receives an output of the analog-to-digital converter 106 and an output of the complex conjugation circuit 126 and multiplies the value of a current sample $r(i+1)$ with the value of the complex conjugate of the immediately preceding sample $r^*(i)$. By this multiplication, a vector having an angle representing the phase angle between the successive symbol samples $r(i)$ and $r(i+1)$ is produced.

As will be appreciated by those of ordinary skill in the art, the N-symbol delay and multiplication performed by N-symbol delay circuit 124 and complex conjugation circuit 126, respectively, may be performed on any pair of symbols in a communication stream for which an expected differential phase angle under ideal conditions is known.

In the illustrated embodiment, assuming that $r(i)$ represents the ith symbol of a received signal $R(t)$ and that $r^*(i)$ represents the complex conjugate of the ith symbol, the output $z'(i)$ of the complex multiplier 128 for the ith symbol is represented by $r(i)^*r(i+1)$. As noted above, in $\pi/4$-shifted DQPSK, the phase angle of all of the value's of $z'(i)$ will be one of the four values $\pm 45°$ or $\pm 135°$ in an ideal channel.

In order to determine the phase rotation due to frequency offset, the phase angle of successive values of $z'(i)$ are compared to the appropriate ideal values of $\pm 45°$ or $\pm 135°$ to determine a deviation from ideal conditions. The tighter the set of values of $z'(i)$ to ideal values, the smaller the amount of frequency offset. As will be appreciated by those in the art, the frequency at which offset compensation is performed may be increased when the calculated value of frequency offset is small, and may be increased when frequency offset is large.

To simplify the comparison of $z'(i)$, values, a phase rotation circuit 130 modifies the values of $z'(i)$ so that they each have positive I and Q components. This is done by rotating each of the $z'(i)$ values by either $\pm 90°$ or $180°$ to produce a vector $z(i)$ lying in the first quadrant. As noted above, since the value of $z'(i)$ will have an angle of $\pm 45°$ or $\pm 135°$ under ideal conditions, the value of $z'(i)$ in a distorted channel will vary, but will still be in the vicinity of these angles. Thus, if $z'(i)$ has a value in the vicinity of $-45°$, rotation of $z'(i)$ by $+90°$ will produce a complex vector having an angle in the vicinity of $45°$. Similarly, if $z'(i)$ has an angle in the vicinity of $\pm 135°$, rotation by $-90°$ will result in a complex vector $z(i)$ having an angle in the vicinity of $45°$. If $z'(i)$ is in the vicinity of $-135°$, rotation by $180°$ will result in a complex vector $z(i)$ having an angle in the vicinity of $45°$. The result of the phase rotation performed by the phase rotation circuit 130 is thus a vector $z(i)$ having an angle which is $45°$ in an ideal channel. The rotation may be accomplished by successively rotating each value of $z'(i)$ which does not have positive I and Q components by $+90°$.

Channel-induced distortion due to multipath fading and the like will cause deviation from the ideal angle of $45°$. As noted above, however, frequency offset results in a constant phase rotation at a frequency of $\Delta\omega$, where $\Delta\omega$ is the differential phase error or phase rotation due to frequency offset. Detection of this constant phase rotation facilitates the elimination of frequency offset. The resultant constellation of expected phase values at the output of the phase rotation circuit 130 includes vectors which have expected differential phase values of $\pm 45°$ and $\pm 135°$ in the phase plane, but are offset by an angle $\Delta\omega T$, which represents the phase increment due to frequency offset in one symbol period. When viewed successively, the frequency offset results in a constant phase rotation at an angular velocity dependent upon the value of $\Delta\omega$. Removal of this phase rotation eliminates frequency offset between the local oscillator 110 and the detected signal $R(t)$. Since the inventive method is capable of detecting phase shift due to frequency offset between successive received symbols, estimation elimination of frequency offsets which result in constant and non-constant phase shifts over a given period of time are possible.

The above-described multiplication $r^*(i)r(i+1)$ and subsequent phase rotation results in a vector $z(i)$ having an angle that, in an ideal channel, is $45°$. In the presence of frequency offset and other channel distortion, the actual angle will deviate from $45°$ and will equal $45°+\Delta\omega T$, wherein T is the symbol period. Determination of the value of $\Delta\omega$ by the frequency offset estimation and correction circuit 122 is described below.

In the presently preferred embodiment, a frequency offset calculating circuit 132 receives the output of the phase rotation circuit 130. A desired number of $z(i)$ values are accumulated in the frequency offset calculating circuit 132 and are used to detect a constant deviation from $45°$ (i.e., $\Delta\omega$). As will be readily appreciated by those of ordinary skill in the art, the number of values of $z(i)$ necessary to determine a constant deviation in ideal phase value will vary depending upon the application and may be varied depending upon the magnitude of deviation from $45°$ initially detected in the output of the phase rotation circuit 130. In communication systems employing packetized data transfer, phase error due to frequency offset will generally be expressed as a constant deviation from the ideal angle of $45°$, while other distortion phenomenon will vary in a more random manner. Once a constant deviation from $45°$ is detected, the accumulation of values of $z(i)$ may be stopped and the average deviation may be used to determine frequency offset based upon the average phase deviation, i.e., based on the average amount that the z(i) values deviate from 45°. Of course, spurious phase offsets which do not result in a constant deviation from 45° may also be corrected.

Preferred embodiments of frequency offset determination include the averaging of several z(i) values to determine an average or constant phase deviation, or correlation of the z(i) values using a bank of unit vectors with angles in the vicinity of 45°, e.g., 45°+d, 45°+2d, 45°+3d, . . . , wherein d is an incremental angle and is set based upon the desired resolution of the system. The unit vector having the best correlation to the calculated value of 45°+$\Delta\omega$T is selected.

After the phase deviation is determined, the frequency offset calculating circuit 132 outputs a value expressed as exp(−j2π$\Delta\omega$T), wherein $\Delta\omega$T represents the phase deviation. This value is supplied to a complex multiplier 134 and is multiplied by the output of the analog-to-digital converter 106 to effectively adjust the frequency of the local oscillator and remove the frequency offset.

Embodiments of the present invention can achieve the frequency offset adjustment by making the local oscillator 110 variable in frequency. In the illustrated embodiment, however, the frequency reference is embodied in the combination of a fixed-frequency oscillator 110 and a phase-offset generator comprising the complex multiplier 134. The complex multiplier 134 multiplies the nth complex sample by the output exp(−j2π$\Delta\omega$T) of the frequency offset calculating circuit 132, where 2π$\Delta\omega$T is a frequency offset determined in the manner described above. It is the resultant frequency-corrected samples from the mixer 134 that subsequent processing circuitry 107, which may include an adaptive equalizer and audio processing circuitry, uses to produce the receiver output, which is typically speech. These samples are in general complex, of course, but some embodiments may use only the real or only the imaginary components to generate the receiver output from the complex samples.

In order to improve the estimation process against fading and noise, received samples r(i) having an energy that is above a certain fixed or dynamically calculated threshold may be selected for use in the above-described process. One such threshold may be the average received signal power or a multiple or fraction thereof over a specified period of time, such as a frame period.

Figure 3:
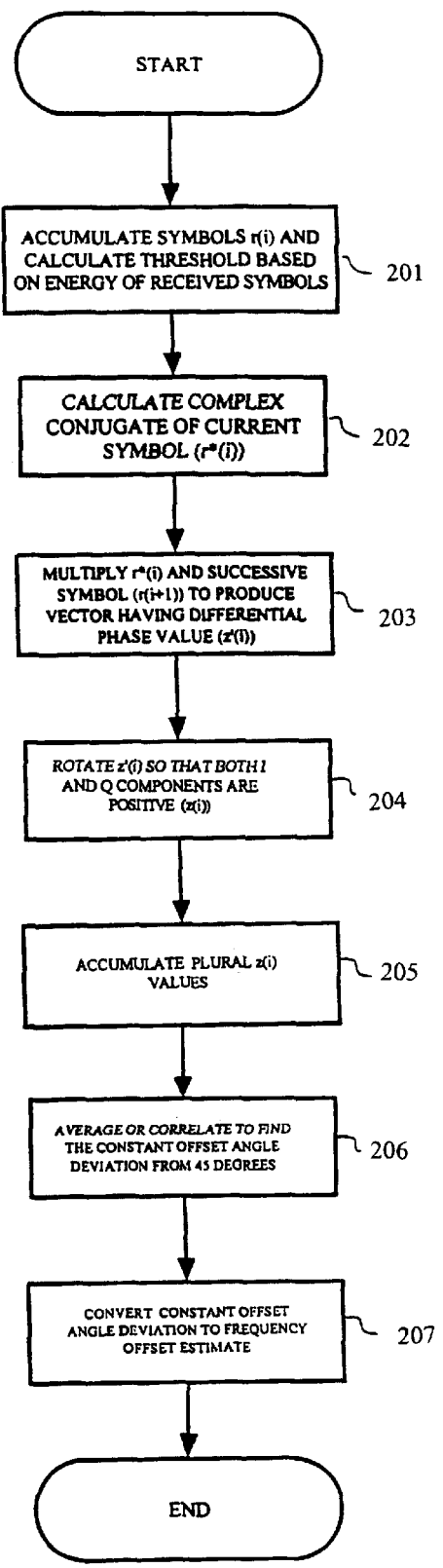
FIG. 3 is a flowchart of a method for estimating and compensating for frequency offset in accordance with the present invention.

FIG. 3 is a flowchart illustrating the method of frequency offset estimation and compensation according to the present invention. As illustrated, after a sufficient number samples r(i) have been detected to determine a suitable threshold value proportional to the energy of the samples (step 201), the complex conjugate of a sample r*(i) above the threshold value is determined (step 202) and is multiplied by the value of r(i+1) (step 203), assuming that the value r(i+1) is also above the threshold level. The resulting vector, z'(i) is rotated so that both of its I and Q components are positive to produce vectors z(i) (step 204). A plurality of values of z(i) are then accumulated (step 205). By averaging or correlating the values of the rotated vectors z(i) to determine a deviation from an ideal differential phase angle of 45° (step 206), a phase deviation due to frequency offset is determined (step 207). The phase deviation is used to correct for the frequency offset.

In summary, to correct for frequency offset according to the present invention, received pairs of successive symbols in a communication system are multiplied to produce a vector having an angle representing the phase difference therebetween. The resultant values are normalized so that the in-phase and quadrature phase components are positive.

In π/4-shifted DQPSK, the angle of the normalized values, in an ideal channel, should be 45°. A deviation from 45° is observed, which is indicative of "phase rotation" due to frequency offset between the local reference and the carrier. This phase rotation can then be used to adjust the local reference. Since this approach eliminates the need to average over long periods, the filtering out of data-dependent effects, and the use of known data sequences, the time required to achieve adequate frequency-offset compensation is shorter in many important environments than it is for conventional systems.

Frequency offset estimation and compensation according to the present invention can be performed in many different ways. For instance, a one-time frequency offset determination can be made for each call set-up and handoff, in which case the frequency offset value output by the frequency offset calculating circuit 132 remains unchanged most of the time. When a call set-up or handoff occurs, i.e., when a mobile unit has begun communicating with a new base station, the frequency offset estimation and correction circuit 122 begins accumulating z(i) values to calculate frequency offset. Alternatively, frequency offset determination can be made to compensate for crystal oscillator inaccuracies or drift, such calculations being necessary only periodically. In the alternative, of course, one could update the frequency continually or at time intervals which depend upon the magnitude of the last-detected offset value. Thus, in particularly noisy environments, offset can be compensated for more frequently than in environments in which offset amount is small.

Although the foregoing description provides means for blind frequency offset estimation, i.e., offset detection without a priori knowledge of the content of a received signal sequence, the invention is not so limited and may be used in connection with predetermined symbol sequences. For instance, a predetermined symbol sequence can be stored in memory, and when the same sequence is detected in an incoming signal, the symbol multiplication values z'(i) for the received sequence can be compared to similar values based on the pre-stored sequence to determine a constant phase error due to frequency offset. For this purpose, a sync word, pilot sequence, training sequence, or the like, may be used as the predetermined sequence.

We claim:

1. A radio receiver comprising:
   receiver means for receiving input signals resulting from transmission of sequences of complex-valued symbols;
   comparison means for comparing pairs of successively received complex-valued symbols to determine a differential phase angle there between, wherein the comparison means comprises multiplying means for multiplying a complex conjugate of a received complex-valued symbol and a succeeding symbol to form a vector;
   rotating means for rotating the vector to a single quadrant while maintaining angular information; and
   frequency offset estimating means for determining a deviation of the differential phase angle from an ideal phase angle value and estimating a frequency offset based upon the deviation, so that a frequency offset for an individual pair of successively received symbols may be estimated.

2. The radio receiver according to claim 1; wherein the comparison means includes means for determining a plurality of differential phase angles for a plurality of pairs of successively received complex-valued symbols, and the frequency offset estimating means includes means for determining a constant deviation of the differential phase angles from an ideal phase angle value by averaging the plurality of differential phase angle values.

3. The radio receiver according to claim 1; wherein the comparison means includes means for determining a plurality of differential phase angles for a plurality of pairs of successively received complex-valued symbols, and the frequency offset estimating means includes means for determining a constant deviation of the differential phase angles from an ideal phase angle value by correlating each of the differential phase angle values against a bank of unit vectors each having a phase angle offset from the ideal phase angle value by a predetermined incremental angle value.

4. The radio receiver according to claim 1;
wherein the rotating means further rotates the vector so that the angle thereof is between 0° and 90°.

5. The radio receiver according to claim 4; wherein the comparison means includes means for determining a plurality of differential phase angles for a plurality of pairs of successively received complex-valued symbols, and the frequency offset estimating means includes means for determining a constant deviation of the differential phase angles from an ideal phase angle value by averaging the plurality of differential phase angle values.

6. The radio receiver according to claim 4; wherein the comparison means includes means for determining a plurality of differential phase angles for a plurality of pairs of successively received complex-valued symbols, and the frequency offset estimating means includes a means for determining a constant deviation of the differential phase angles from an ideal phase angle value by correlating each of the differential phase angle values against a bank of unit vectors each having a phase angle offset from the ideal phase angle value by a predetermined incremental angle value.

7. The radio receiver according to claim 1, wherein the frequency offset estimating means includes means for determining a constant deviation of the phase angle from an ideal phase angle value by calculating an average phase angle for a plurality of successive comparison vectors.

8. The radio receiver according to claim 1; wherein the frequency offset estimating means includes means for determining a non-constant deviation of the phase angle from an ideal phase angle value by calculating an average phase angle for a plurality of successive comparison vectors.

9. The radio receiver according to claim 1; further comprising frequency offset correction means for correcting for a frequency offset between the receiver means and a carrier frequency of an input signal based upon the estimated frequency offset.

10. The radio receiver according to claim 9; wherein the receiver means comprises an analog receiver having a fixed-frequency local oscillator, and the frequency offset correction means includes means for correcting for a frequency offset between the fixed-frequency local oscillator and a carrier frequency of an input signal based upon the estimated frequency offset.

11. The radio receiver according to claim 1; further comprising sampling means for sampling complex-valued outputs of the receiver means.

12. The radio receiver according to claim 1; wherein the input signals are symbols modulated by π/4-shifted DQPSK.

13. A radio receiver comprising:
an antenna for receiving a signal;
a coherent detector having a fixed-frequency local oscillator, the coherent detector being connected to the antenna for receiving input signals resulting from transmission of sequences of symbols;
a complex multiplier for multiplying a complex conjugate of a selected received symbol and a succeeding symbol to output a comparison vector having an angle equal to the differential phase angle between the selected received complex-valued symbol and the succeeding symbol;
phase rotating means for rotating the comparison vector so that the angle thereof is between 0° and 90° and in a single quadrant while maintaining angular information;
frequency offset estimating means for determining a deviation of the differential phase angle from an ideal phase angle value and estimating a frequency offset based upon the deviation, so that a frequency offset for an individual pair of successively received symbols may be estimated; and
frequency offset correction means for correcting for a frequency offset between the local oscillator of the coherent detector and a carrier frequency of an input signal based upon the estimated frequency offset of the pair of successively received symbols.

14. The radio receiver according to claim 13; wherein the comparison means includes means for determining a plurality of differential phase angles for a plurality of pairs of successively received symbols, and the frequency offset estimating means includes means for determining a constant deviation of the differential phase angles from an ideal phase angle value by averaging the plurality of differential phase angle values.

15. The radio receiver according to claim 13; wherein the comparison means includes means for determining a plurality of differential phase angles for a plurality of pairs of successively received symbols, and the frequency offset estimating means includes means for determining a non-constant deviation of the differential phase angles from an ideal phase angle value by averaging the plurality of differential phase angle values.

16. The radio receiver according to claim 13; wherein the comparison means includes means for determining a plurality of differential phase angles for a plurality of pairs of successively received complex-valued symbols, and the frequency offset estimating means includes means for determining a constant deviation of the differential phase angles from an ideal phase angle value by correlating each of the differential phase angle values against a bank of unit vectors each having a phase angle offset from the ideal phase angle value by a predetermined incremental angle value.

17. The radio receiver according to claim 13; wherein the comparison means includes means for determining a plurality of differential phase angles for a plurality of pairs of successively received complex valued symbols, and the frequency offset estimating means includes means for determining a non-constant deviation of the differential phase angles from an ideal phase angle value by correlating each of the differential phase angle values against a bank of unit vectors each having a phase angle offset from the ideal phase angle value by a predetermined incremental angle value.

18. The radio receiver according to claim 13, wherein the frequency offset estimating means includes means for determining a constant deviation of the phase angle from an ideal phase angle value by calculating an average phase angle for a plurality of successive comparison vectors.

19. The radio receiver according to claim 13; wherein the frequency offset estimating means includes means for determining a non-constant deviation of the phase angle from an ideal phase angle value by calculating an average phase angle for a plurality of successive comparison vectors.

20. The radio receiver according to claim 13; further comprising sampling means for sampling complex-valued outputs of the receiver means.

21. The radio receiver according to claim 13; wherein the input signal are symbols modulated by π/4-shifted DQPSK.

22. A method for frequency offset estimation, comprising the steps of:
- comparing successively received complex-valued symbols to determine a phase angle there between;
- multiplying a complex conjugate of a received complex-valued symbol and a succeeding symbol to produce a vector;
- rotating the vector to a single quadrant while maintaining angular information;
- determining the value of a constant deviation of the phase angle from an ideal phase angle value; and
- estimating a frequency offset based upon the constant deviation.

23. The method for frequency offset estimation according to claim 22; wherein the step of rotating further comprises rotating the vector so that the angle thereof is between 0° and 90°.

24. The method for frequency offset estimation according to claim 23; wherein the step of estimating the frequency offset comprises the step of determining a constant deviation of the phase angle from an ideal phase angle value by calculating an average phase angle for plurality of successive comparison vectors.

25. The method for frequency offset estimation according to claim 21; further comprising the step of correcting for a frequency offset between a receiver and a carrier frequency of an input signal based upon the estimated frequency offset.

26. The method for frequency offset estimation according to claim 25, wherein the step of correcting for a frequency offset includes the step of correcting for a frequency offset between the local oscillator of a receiver and a carrier frequency of a signal received thereby based upon the estimated frequency offset.

* * * * *